(12) United States Patent
Barbat et al.

(10) Patent No.: US 10,246,044 B2
(45) Date of Patent: Apr. 2, 2019

(54) VEHICLE HOOD ASSEMBLY WITH DEPLOYABLE PEDESTRIAN PROTECTION

(71) Applicant: Ford Global Technologies, LLC, Dearborn, MI (US)

(72) Inventors: Saeed David Barbat, Novi, MI (US); Dean M. Jaradi, Macomb, MI (US); S. M. Iskander Farooq, Novi, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 457 days.

(21) Appl. No.: 15/042,166

(22) Filed: Feb. 12, 2016

(65) Prior Publication Data

US 2017/0232925 A1     Aug. 17, 2017

(51) Int. Cl.
*B60R 21/36* (2011.01)
*B60R 21/38* (2011.01)
(Continued)

(52) U.S. Cl.
CPC .............. *B60R 21/36* (2013.01); *B60R 21/34* (2013.01); *B62D 25/105* (2013.01); *B62D 25/12* (2013.01);
(Continued)

(58) Field of Classification Search
CPC ... B60R 21/34; B60R 21/38; B60R 2021/343; B60R 21/36
See application file for complete search history.

(56) References Cited

U.S. PATENT DOCUMENTS

| 6,386,623 B1 | 5/2002 | Ryan et al. |
| 7,140,673 B2 | 11/2006 | Ito et al. |

(Continued)

FOREIGN PATENT DOCUMENTS

| DE | 19851489 A1 | 5/2000 |
| DE | 10057941 A1 | 5/2002 |

(Continued)

OTHER PUBLICATIONS

Whipple, "TRW announces next-gen pedestrian protection", SAE International, Automotive Engineering Magazine, Jul. 30, 2012 (1 page).

(Continued)

*Primary Examiner* — Ruth Ilan
(74) *Attorney, Agent, or Firm* — Frank A. MacKenzie; Bejin Bieneman PLC (57) ABSTRACT

A hood assembly for a vehicle includes an inner hood, an outer hood, and a plurality of deployable devices. The outer hood is fixed relative to the inner hood. The plurality of deployable devices are spaced apart from each other between the inner hood and the outer hood. The deployable devices each define an inflation chamber and are formed of thermoplastic elastomer. Upon detection of impact between the vehicle and a pedestrian, the deployable devices are deployed to separate the outer hood and the inner hood. As such, during impact of the pedestrian with the outer hood, the outer hood may deform and/or the outer hood may space the pedestrian from relatively hard components under the hood assembly.

17 Claims, 6 Drawing Sheets

(51) Int. Cl.
*B62D 25/12* (2006.01)
*B60R 21/34* (2011.01)
*B62D 25/10* (2006.01)
*B60R 21/00* (2006.01)

(52) U.S. Cl.
CPC . *B60R 2021/0048* (2013.01); *B60R 2021/343* (2013.01)

(56) References Cited

U.S. PATENT DOCUMENTS

| | | |
|---|---|---|
| 7,150,496 B2 | 12/2006 | Fukimoto |
| 7,246,677 B2 | 7/2007 | Fredriksson et al. |
| 7,392,876 B2 | 7/2008 | Browne et al. |
| 7,488,031 B2 | 2/2009 | Ishitobi |
| 2004/0182629 A1 | 9/2004 | Takahashi et al. |
| 2005/0046153 A1* | 3/2005 | DePottey ............ B60R 21/217 280/728.2 |
| 2007/0284862 A1* | 12/2007 | Kashiwagi ............ B60R 21/207 280/740 |
| 2012/0090460 A1 | 4/2012 | Rick |

FOREIGN PATENT DOCUMENTS

| | | | |
|---|---|---|---|
| DE | 10061510 A1 | 6/2002 | |
| DE | 10063586 A1 | 8/2002 | |
| DE | 10102597 A1 | 9/2002 | |
| DE | 2005038682 A1 | 4/2006 | |
| DE | 102007015084 A1 * | 10/2007 | ............ B60R 21/38 |
| DE | 2013009616 U1 | 3/2015 | |
| EP | 1318062 A2 | 6/2003 | |
| EP | 1364846 A2 | 11/2003 | |
| JP | 7125607 A | 5/1995 | |
| JP | H10152018 A | 6/1998 | |
| JP | 2003182486 A | 7/2003 | |
| JP | 2006056327 A * | 3/2006 | ............ B60R 21/34 |
| KR | 100756946 B1 | 9/2007 | |
| WO | 0198118 A2 | 12/2001 | |

OTHER PUBLICATIONS

UK Search Report 16681P; GB Appl. GB1702304.5 dated Jun. 23, 2017; 5 pages.
UK Search Report 16680P; GB Appl. GB1702301.1 dated Jun. 22, 2017; 5 pages.

* cited by examiner

VEHICLE HOOD ASSEMBLY WITH DEPLOYABLE PEDESTRIAN PROTECTION

BACKGROUND

A hood assembly of a vehicle may be designed to be low profile, e.g., a relatively low hood height, which may allow for a desired styling. However, such a design may bring panels of the hood assembly closer to relative hard points under the hood assembly, e.g., an engine. Thus, the "crush space" between the hood and underlying hard points is reduced. A desire for a low profile design for a hood assembly may be in tension with design factors that favor increased "crush space" to reduce the likelihood of head impact injuries to pedestrians involved in pedestrian-vehicle impacts. Specifically, the increased "crush space" spaces the pedestrian from the relative hard points under the hood assembly and/or allows for greater hood deformation, which absorbs energy from and reduces the impact velocity of the pedestrian.

Therefore, there remains an opportunity to design an improved design to allow low-profile hood assembly styling while accommodating design factors to reduce the likelihood of injury to pedestrians during pedestrian-vehicle impacts.

DETAILED DESCRIPTION

With reference to the Figures, wherein like numerals indicate like parts throughout the several views, a hood assembly 40 for a vehicle 30 includes an inner hood 42, an outer hood 44, and a plurality of deployable devices 70. The outer hood 44 is fixed relative to the inner hood 42. The plurality of deployable devices 70 are spaced apart from each other between the inner hood 42 and the outer hood 44. The deployable devices 70 each define an inflation chamber 78 and are formed of thermoplastic elastomer.

Figure 1:
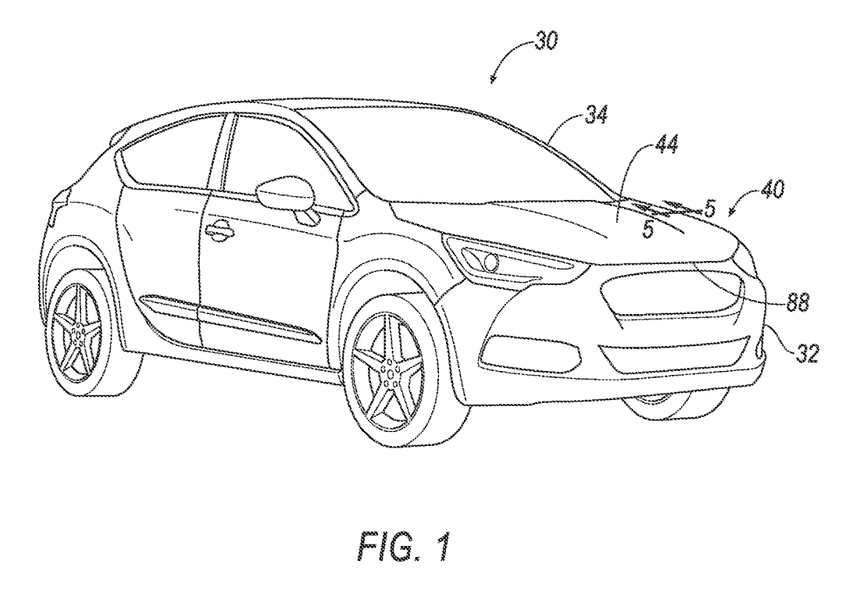
FIG. 1 is a perspective view of a vehicle including a hood assembly.
Figure 2:
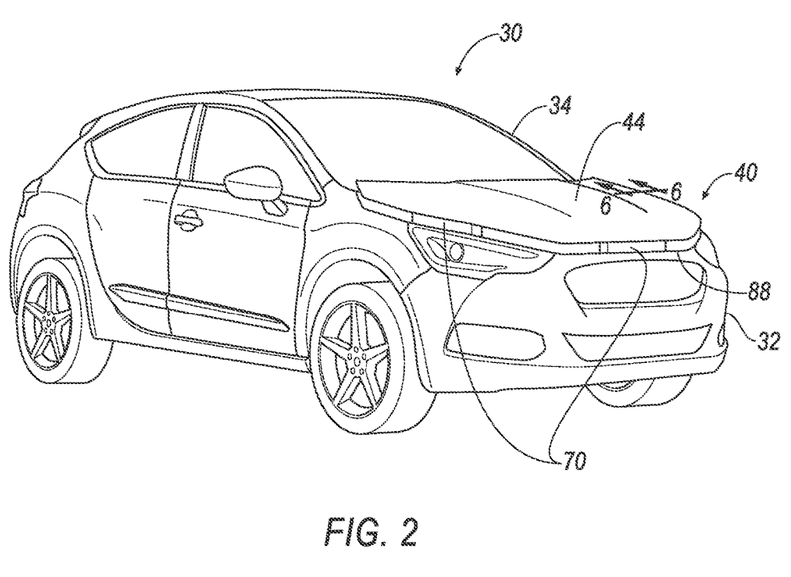
FIG. 2 is a perspective view of the vehicle with a plurality of deployable devices of the hood assembly in deployed positions.
Figure 3:
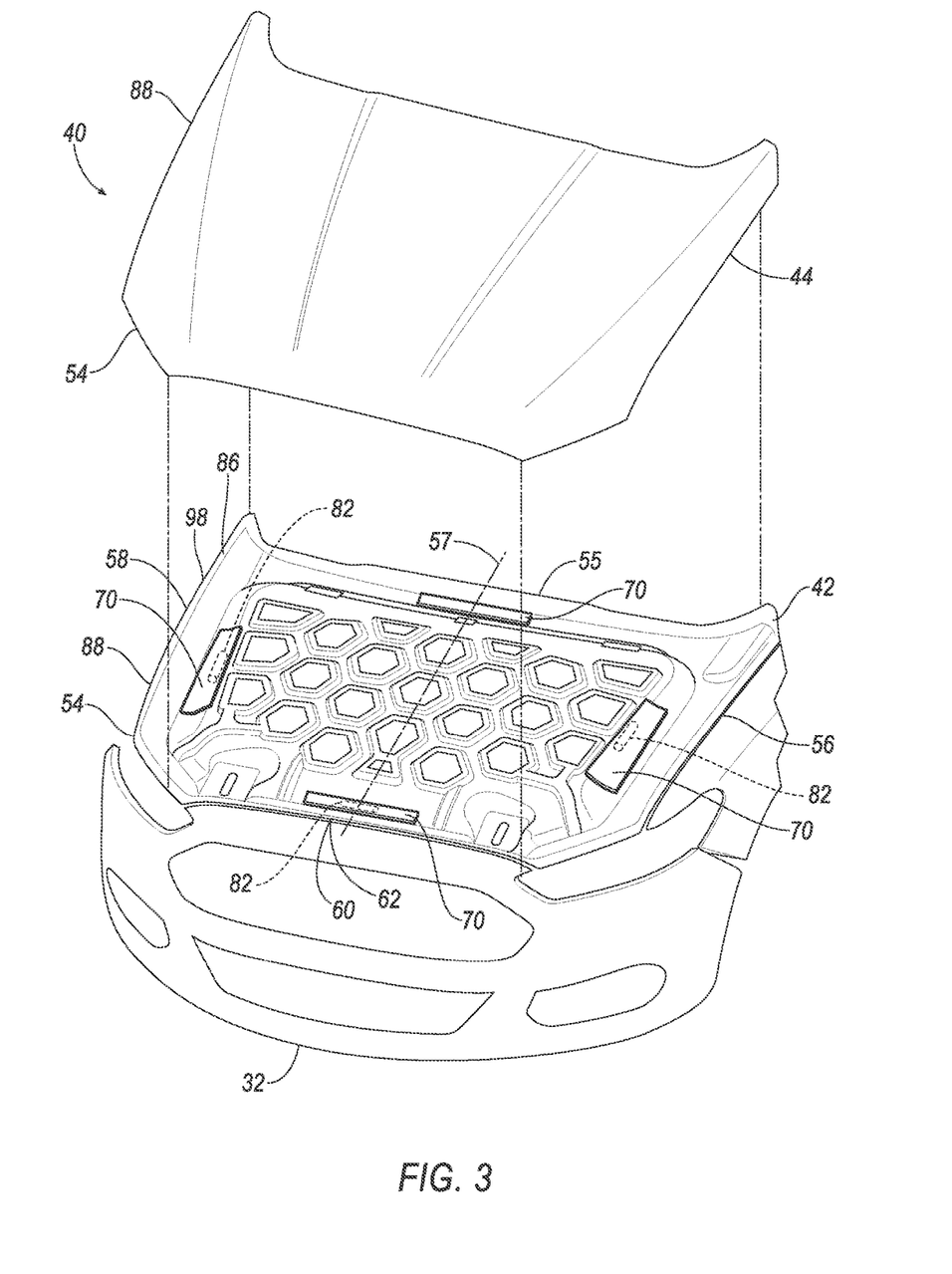
FIG. 3 is a partially exploded view of the hood assembly with an upper hood exploded away from an inner hood to illustrate the plurality of deployable devices therebetween, with the deployable devices in undeployed positions.
Figure 4:
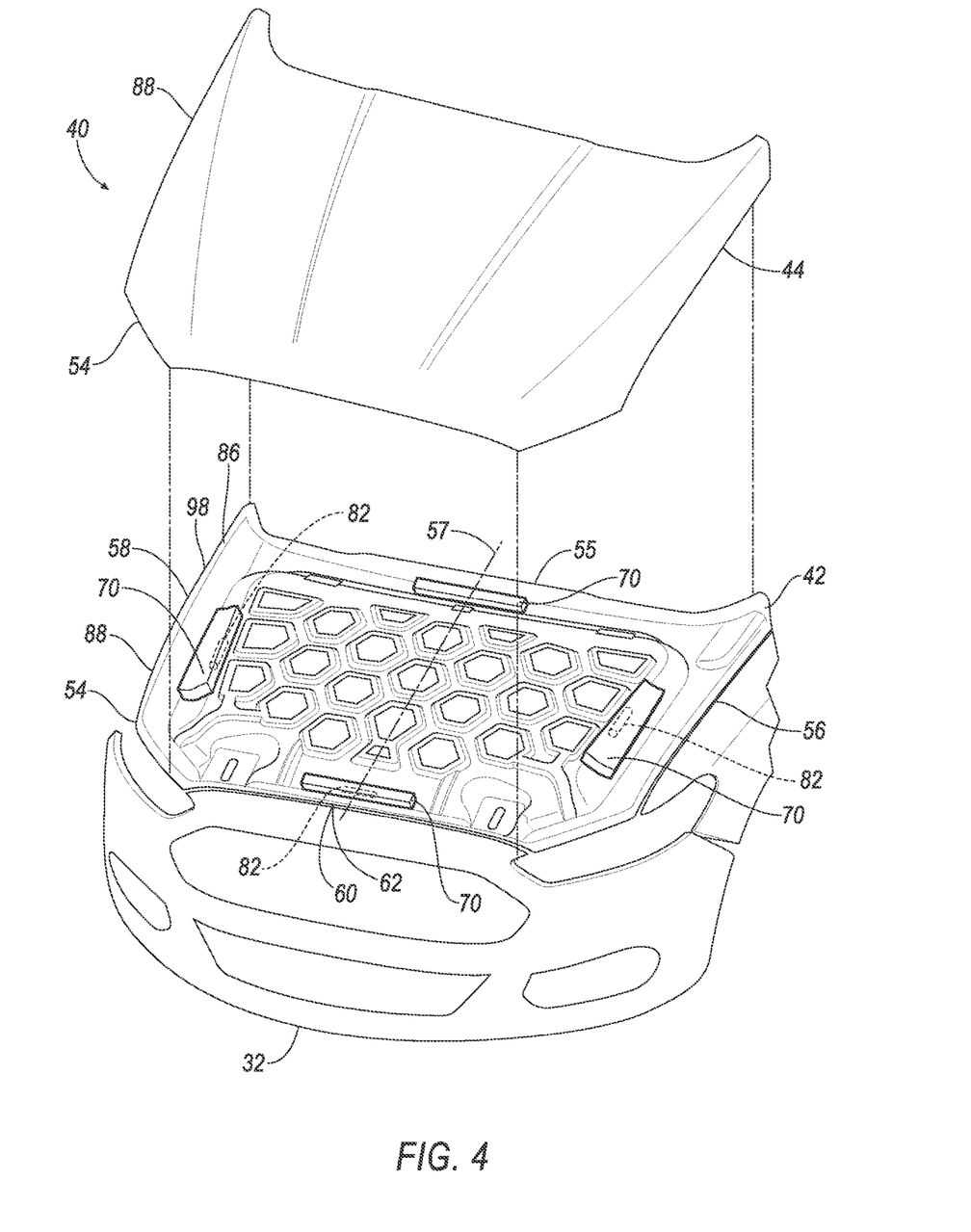
FIG. 4 is the partially exploded view of the hood assembly of FIG. 3 with one of the plurality of deployable device in the deployed position.
Figure 5:
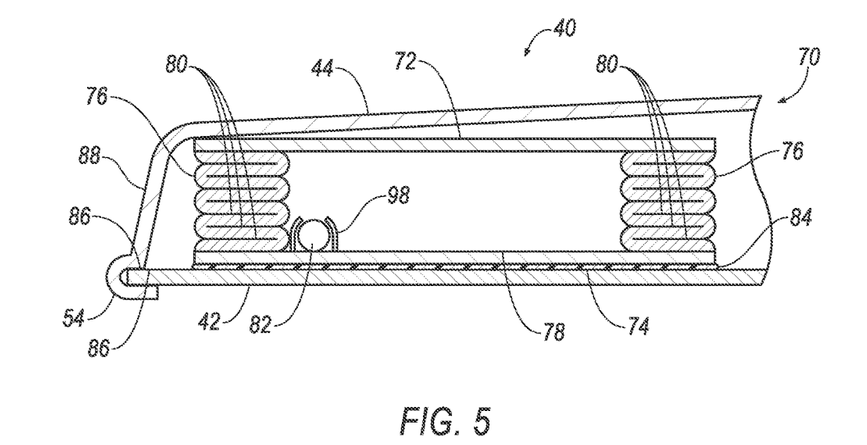
FIG. 5 is a cross-sectional view of the hood assembly with one of the plurality of deployable devices in the undeployed position.
Figure 6:
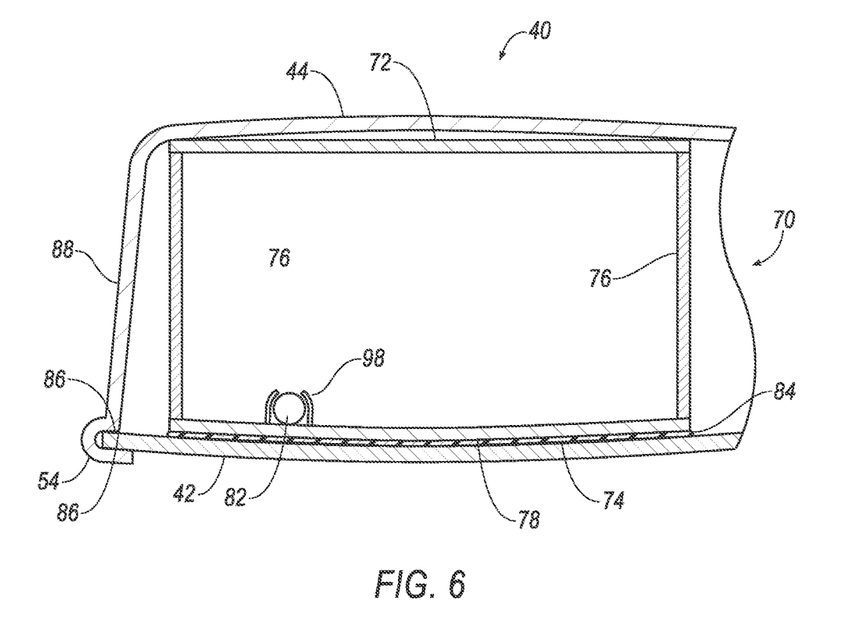
FIG. 6 is a cross-sectional view of the hood assembly with one of the plurality of deployable device in the deployed position.

The plurality of deployable devices 70 may be deployed from an undeployed position, as shown in FIGS. 1, 3, and 5, to a deployed position, as shown in FIGS. 2, 4, and 6, to move, e.g., deform, the inner hood 42 and the outer hood 44 relative to each other. As shown in FIGS. 2 and 6, in the deployed position the plurality of deployable devices 70 selectively increase the space between the outer hood 44 and relatively hard components under the hood assembly, e.g., an engine (not shown), during a collision between the vehicle 30 and the pedestrian. The increased space may reduce the likelihood of injury to pedestrians, e.g., head injuries. At the same time, since the plurality of deployable devices 70 are disposed between the inner hood 42 and the outer hood 44, the vehicle hood assembly 40 may have a low-profile design.

With reference to FIGS. 1 and 2, the vehicle 30 may include a front bumper 32 and the vehicle hood assembly 40. The hood assembly 40 is positioned forward of a windshield 34 and covers the engine. The front bumper 32 may be located below a front of the hood assembly 40 and may absorb energy in a frontal collision for the vehicle 30. The front bumper 32 may support an impact sensor 92, as discussed further below.

With reference to FIGS. 3-6, the outer hood 44 is disposed above the inner hood 42. As shown in the Figures the outer hood 44 is exposed when the hood assembly 40 is in a closed position. The outer hood 44 may present a class-A surface, e.g., a finished surface exposed to view by a customer and free of unaesthetic blemishes and defects. The inner hood 42 and the outer hood 44 may be formed of the same type of material. The inner hood 42 and/or the outer hood 44 may, for example, be formed of plastic, for example, sheet molding composite (SMC), carbon fiber reinforced plastic (CFRP), fiberglass, and/or other fiber reinforced plastic. Alternatively, the inner hood 42 and the outer hood 44 may be formed of metal, e.g., aluminum, steel, etc.

The outer hood 44 is fixed relative to the inner hood 42, that is, the outer hood 44 is directly or indirectly attached to the inner hood 42. Specifically, the inner hood 42 and the outer hood 44 may each include a mounting surface 86. The mounting surfaces 86 may be formed into a hem flange 54 connecting the inner hood 42 and the outer hood 44. Alternatively, the mounting surfaces 86 may be bonded to each other, e.g., by application of adhesive, plastic welding, metal welding etc. The mounting surfaces may 86 extend along an elongated path, which generally extends along a periphery 88 of the inner hood 42 and/or the outer hood 44.

The periphery 88 of the hood assembly 40 may be generally rectangular. Specifically, hood assembly 40 may include a left edge 56, a right edge 58 spaced from the left edge 56 in a cross-vehicle direction, a rear edge 55 extending from the left edge 56 to the right edge 58, and a front edge (not numbered) spaced from the rear edge 55 and extending from the ledge edge 56 to the right edge 58. Specifically, the inner hood 42 (as shown in the Figures), the outer hood 44, or both, may include the left edge 56, the right edge 58, the rear edge 55, and the front edge. The left edge 56 and the right edge 58 may generally extend in vehicle fore-aft direction, in other words, along a direction of travel of the vehicle. The rear edge 55 and the front edge may generally extend in a cross-vehicle direction. The rear edge 55 may extend along the windshield 34 from the left edge 56 to the right edge 58. Specifically, the rear edge 55 may extend along the windshield 34 adjacent to the windshield 34, e.g., with the absence of anything between the windshield 34 and the rear edge 55, when the hood assembly 40 is closed. The inner hood 42 may include a longitudinal centerline 57 extending in the vehicle fore-aft direction between the left edge 56 and the right edge 58. The inner hood 42 may be symmetrical about the longitudinal centerline 57.

The hood assembly 40 may be attached to the frame (not numbered) of the vehicle 30 at a hinge (not shown). The hinge may be fixed to the inner hood 42 and/or to the outer hood 44. The inner hood 42, the outer hood 44, and the deployable device 70 move together as a unit about the hinge, e.g., to access the engine of the vehicle 30. A latch 60 may selectively fix the hood assembly 40 in a closed position relative to the body of the vehicle 30.

The latch 60 may be attached to an underside of the outer hood 44 to fasten to a fastening mechanism 62 above the front bumper 32. When someone wishes to, for example, inspect the engine 36, the latch 60 unfastens from the fastening mechanism 62, and the vehicle hood assembly 40 tilts upwards as a unit at the hinge.

With reference to FIGS. 3 and 4, the plurality of deployable devices 70 may be disposed between the inner hood 42 and the outer hood 44 may be spaced from each other at various locations within the periphery 88. The deployable devices 70 may be disposed at the periphery 88 or may be spaced inwardly from the periphery 88. For example, at least one of the plurality of deployable devices 70 may be disposed adjacent to the latch 60, e.g., above the latch 60. For example, one of the deployable devices 70 may be located adjacent to a vertically projected area of the latch 60 onto the inner hood 42. As another example, at least one of the plurality of deployable devices 70 may be adjacent to the right edge 58, and at least one of the plurality of deployable devices 70 may be adjacent to the left edge 56. As another example, at least one of the plurality of deployable devices 70 may be adjacent to the rear edge 55. Specifically, at least one of the plurality of deployable devices 70 may be disposed adjacent the rear edge 55 on the longitudinal centerline 57.

As set forth further below, the deployable devices 70 may be inflated to separate the outer hood 44 from the inner hood 42. Specifically, the deployable devices 70 may separate the outer hood 44 from the inner hood 42 along the periphery 88, e.g., along the left edge 56, the right edge 58, the rear edge 55, and/or the front edge. The deployable devices 70 may separate the outer hood 44 from the inner hood 42 at discrete locations, or may work in conjunction with each other to move the entire outer hood 44 away from the inner hood 42 as a unit.

With reference to FIGS. 5 and 6, each deployable device 70 may include a top panel 72, a bottom panel 74, and sides 76 connecting the top panel 72 and the bottom panel 74. The deployable devices 70 each defines an inflation chamber 78; specifically, the sides 76 define the inflation chamber 78 therebetween. The inflation chamber 78 is enclosed by the top panel 72, the bottom panel 74, and the sides 76. The deployable device 70 may have vents (not shown) extending from the inflation chamber 78 through the top panel 72, the bottom panel 74, and/or the sides 76 to allow the deployable device 70 to vent, e.g., to allow the deployable device 70 to deflate and soften upon impact between the hood assembly 40 and a pedestrian.

The top panel 72, the bottom panel 74, and the sides 76 may be molded. In other words, the top panel 72, the bottom panel 74, and the sides 76 may be formed from a molding process in which a liquid or pliable material is molded under pressure in a mold, e.g., injection molding, blow molding, extrusion molding, etc.

The top panel 72 and the bottom panel 74 are each from 1 to 3 millimeters thick. The top panel 72 and the bottom panel 74 may have the same thickness, or may have different thicknesses. The top panel 72 and/or the bottom panel 74 may be thicker than the sides 76.

The sides 76 may define pleats 80 between the top panel 72 and the bottom panel 74. The pleats 80 are folded when the deployable device 70 is in the undeployed position, and the pleats 80 are extended when the deployable device 70 is in a deployed position. The pleats 80 may be arranged in an accordion-like fashion or may be folded in any other suitable manner.

Each deployable device 70 is formed of thermoplastic elastomer (TPE). A thermoplastic elastomer has both thermoplastic and elastomeric properties. A thermoplastic material becomes pliable above a particular temperature and solidifies upon cooling, and an elastomer generally has a low Young's modulus and a high failure strain. Types of TPEs include styrenic block copolymers, thermoplastic olefins, elastomeric alloys, thermoplastic polyurethanes, thermoplastic copolyesters, and thermoplastic polyamides. The material forming the deployable device 70 is solid, not woven like a fabric.

The deployable device 70 may be fixed, e.g., bonded, to the inner hood 42 (as shown in FIGS. 5 and 6) and/or the outer hood 44. For example, the deployable device 70 may be fixed to the inner hood 42 with adhesive 84, as shown in FIGS. 5 and 6. Alternatively, or in addition, the deployable device 70 may be fixed to the inner hood 42 and/or the outer hood 44 by welding, such as ultrasonic welding, fasteners, etc.

The hood assembly may include a plurality of inflators 82 each in communication with the inflation chamber 78 of one of the plurality of deployable devices 70. Alternatively, the hood assembly 40 may include one or more inflators 82 in fluid communication with more than one of the inflation chambers 78 of the plurality of deployable devices 70, i.e., more than one of the deployable devices 70 may share one of the inflators 82. The inflators 82 inflate the deployable devices 70 with an inflatable medium, such as a gas.

The inflators 82 may be located inside or outside the deployable devices 70. The inflator 82 may be fixed to the deployable devices 70 or may be remote from the deployable devices 70 and in communication with the inflation chambers 78, e.g., through a fill tube. As one example, as shown in FIGS. 5 and 6, the deployable devices 70 may each define at least one clip 98 in the inflation chamber 78 that fixes one of the plurality of inflators 82 to that deployable device 70. The clip 98 may be of any suitable size and shape to fix each inflator 82 to each deployable device 70. The clip 98, for example, may be integral with the top panel 72, bottom panel 74 (as shown in FIGS. 5 and 6), and/or sides 76, i.e., formed simultaneously with the panel 72, bottom panel 74, and/or sides 76 as a single continuous unit. Alternatively, the clip 98 may be formed separately from and subsequently connected to the top panel 72, bottom panel 74, and/or sides 76.

The inflators 82 may be, for example, pyrotechnic inflators 82 that use a chemical reaction to drive inflation medium to the deployable devices 70. The inflators 82 may be of any suitable type, for example, cold-gas inflators.

Figure 7:
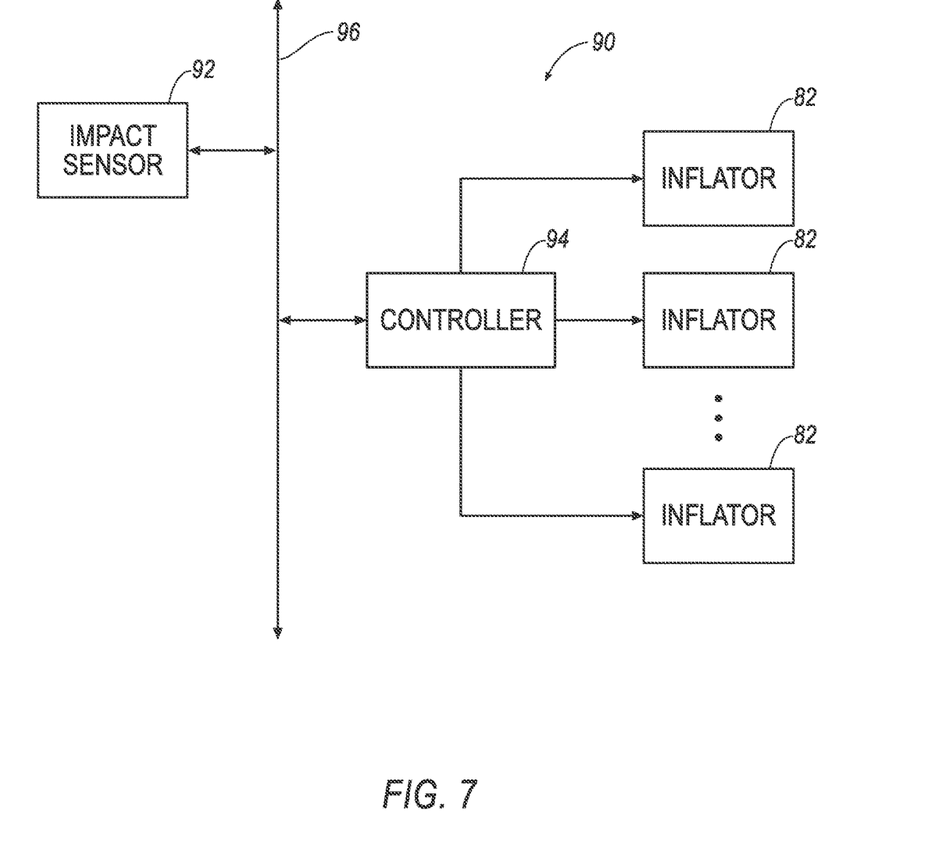
FIG. 7 is a schematic of a control system.

With reference to FIG. 7, the vehicle 30 may include a control system 90 including at least one impact sensor 92 for sensing an impact of the vehicle 30, and a controller 94 in communication with the sensor 92 and the inflator 82 for activating the inflator 82, for example, by providing an impulse to a pyrotechnic charge of the inflator 82, when the sensor 92 senses an impact of the vehicle 30. Alternatively or additionally to sensing impact, the control system 90 may be configured to sense an impending impact prior to the actual impact, that is, pre-impact sensing.

The impact sensor 92 is adapted to detect an impact to the front bumper 32. The impact sensor 92 may be of any suitable type, for example, using radar, lidar, or a vision system. The vision system may include one or more cameras, CCD image sensors, CMOS image sensors, etc. The sensor 92 may be included within the front bumper 32 or may be located elsewhere in the vehicle 30.

The controller 94 may be a microprocessor-based controller. The controller 94 may include a processor, memory, etc. The memory of the controller 94 may store instructions executable by the processor. The impact sensor 92 is in communication with the controller 94 to communicate data to the controller 94. The controller 94 is programmed to instruct the inflator 82 to inflate the deployable device 70 in response to a pedestrian impact sensed by the impact sensor 92.

The control system 94 may transmit signals through a communication network 96 (such as a controller area network (CAN) bus), Ethernet, and/or by any other wired or wireless communication network. The controller 94 may use information from the communication network 96 to control the activation of the inflators 82. The inflators 82 may be connected to the controller 94, as shown in FIG. 7, or may be connected directly to the communication network 96.

In the event that the impact sensor 92 detects a collision with a pedestrian, the impact sensor 92 signals the controller 94 through the communication network 96. The controller 94 instructs the plurality of inflators 82 through the communication network 96 to inflate the plurality of deployable devices 70. Depending on the signals received from the impact sensor, the controller 94 may selectively signal only some of the plurality of inflators 82. The inflators 82 so signaled inflate the deployable devices 70, which change from the undeployed position (as in FIG. 1) to the deployed position (as in FIG. 2). The deployable devices 70 that have been deployed push against the outer hood 44. The outer hood 44 may deform upward, e.g., by approximately 2-3 inches. As the pedestrian impacts the outer hood 44, the outer hood 44 and/or the deployable devices 70 deform to absorb energy from the impact and spaces the pedestrian from components beneath the hood assembly 40, e.g., the engine, the latch 60, the left edge 56, the right edge 58, the rear edge 55, and/or the front edge. The energy absorbed by the hood assembly 40 may reduce the likelihood of the pedestrian impacting a component under the hood assembly 40 and/or may reduce the velocity at which the pedestrian impacts such a component.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle hood assembly comprising:
an inner hood;
an outer hood fixed relative to the inner hood;
a plurality of deployable devices spaced from each other between the inner hood and the outer hood, the deployable devices each defining an inflation chamber and being formed of thermoplastic elastomer; and
a plurality of inflators each disposed inside one of the deployable devices;
wherein each deployable device includes a clip fixing the respective inflator; wherein each clip is a single continuous unit with the respective deployable device.

2. The vehicle hood assembly of claim 1, further comprising an adhesive between each of the plurality of deployable devices and one of the inner hood and outer hood.

3. The vehicle hood assembly of claim 1, wherein the plurality of deployable devices each includes a top panel, a bottom panel, and sides connecting the top panel and the bottom panel, and further comprising adhesive connecting each of the bottom panels of the deployable devices and the inner hood.

4. The vehicle hood assembly of claim 1, wherein the plurality of deployable devices each includes a top panel, a bottom panel, and sides connecting the top panel and the bottom panel and defining pleats between the top panel and the bottom panel, wherein the pleats are folded when the deployable device is in an undeployed position and wherein the pleats are extended when the deployable device is in a deployed position.

5. The vehicle hood assembly of claim 3, wherein the top panels and the bottom panels are each from 1 to 3 millimeters thick.

6. The vehicle hood assembly of claim 1, further comprising a latch fixed relative to the outer hood and the inner hood, wherein at least one of the plurality of deployable devices is disposed above the latch.

7. The vehicle hood assembly of claim 1, wherein the inner hood includes a right edge and a left edge, and wherein at least one of the plurality of deployable devices is adjacent to the right edge and at least one of the plurality of deployable devices is adjacent to the left edge.

8. The vehicle hood assembly of claim 1, wherein the inner hood includes a rear edge and a longitudinal centerline, and wherein at least one of the deployable devices is adjacent to the rear edge and disposed on the longitudinal centerline.

9. A vehicle hood assembly comprising:
an inner hood;
an outer hood fixed relative to the inner hood;
a plurality of deployable devices spaced from each other between the inner hood and the outer hood, the deployable devices each being formed of thermoplastic elastomer, wherein the plurality of deployable devices each includes a molded top panel, a molded bottom panel, and sides connecting the top panel and the bottom panel defining an inflation chamber therebetween; and
a plurality of inflators each disposed inside one of the deployable devices, wherein each deployable device include a clip fixing the respective inflator; wherein each clip is a single continuous unit with the molded bottom panel.

10. The vehicle hood assembly of claim 9, further comprising an adhesive between each of the plurality of deployable devices and one of the inner hood and outer hood.

11. The vehicle of claim 9, further comprising adhesive connecting each of the molded bottom panels of the deployable devices and the inner hood.

12. The vehicle of claim 9, wherein for each of the plurality of deployable devices,
the sides define pleats between the molded top panels and the molded bottom panels, and
the pleats are folded when the deployable device is in an undeployed position and are extended when the deployable device is in a deployed position.

13. The vehicle of claim 9, wherein the top panels and the bottom panels are each from 1 to 3 millimeters thick.

14. The vehicle hood assembly of claim 9, further comprising a latch fixed relative to the outer hood and the inner hood, wherein at least one of the plurality of deployable devices is disposed above the latch.

15. The vehicle hood assembly of claim 9, wherein the inner hood includes a right edge and a left edge, and wherein at least one of the plurality of deployable devices is adjacent to the right edge and at least one of the plurality of deployable devices is adjacent to the left edge.

16. A vehicle comprising:
an inner hood;
an outer hood fixed relative to the inner hood;
a plurality of deployable devices spaced from each other between the inner hood and the outer hood, the deployable devices each defining an inflation chamber and being formed of thermoplastic elastomer; and
a plurality of inflators each disposed inside one of the deployable devices;
wherein each deployable device includes a clip fixing the respective inflator; wherein each clip is a single continuous unit with the respective deployable device; and
an impact sensor; and
a controller programmed to instruct the inflator to inflate the deployable device in response to a pedestrian impact sensed by the impact sensor.

17. The vehicle of claim 16, further comprising a front bumper, the sensor adapted to detect an impact to the front bumper.

* * * * *

UNITED STATES PATENT AND TRADEMARK OFFICE
CERTIFICATE OF CORRECTION

PATENT NO. : 10,246,044 B2
APPLICATION NO. : 15/042166
DATED : April 2, 2019
INVENTOR(S) : Saeed David Barbat et al.

Page 1 of 1

It is certified that error appears in the above-identified patent and that said Letters Patent is hereby corrected as shown below:

In the Claims

Column 6, in Line 43, replace "include a clip fixing" with -- includes a clip fixing --

Signed and Sealed this
Seventh Day of January, 2020

Andrei Iancu
*Director of the United States Patent and Trademark Office*